US012754460B2

(12) United States Patent
Peng et al.

(10) Patent No.: US 12,754,460 B2
(45) Date of Patent: Oct. 6, 2026

(54) OPTICAL ELEMENT DRIVING MECHANISM

(71) Applicant: Actutek Corporation, Taoyuan City (TW)

(72) Inventors: Chun-Chia Peng, Taoyuan City (TW); Po-Xiang Zhuang, Taoyuan City (TW); Chia-Che Wu, Taoyuan City (TW); Yi-Ho Chen, Taoyuan City (TW); Ko-Lun Chao, Taoyuan City (TW); Yi-Fan Lee, Taoyuan City (TW)

(73) Assignee: Actutek Corporation, Taoyuan City (TW)

(*) Notice: Subject to any disclaimer, the term of this patent is extended or adjusted under 35 U.S.C. 154(b) by 211 days.

(21) Appl. No.: 18/628,159

(22) Filed: Apr. 5, 2024

(65) Prior Publication Data

US 2024/0337909 A1 Oct. 10, 2024

Related U.S. Application Data

(60) Provisional application No. 63/586,074, filed on Sep. 28, 2023, provisional application No. 63/457,894, filed on Apr. 7, 2023.

(51) Int. Cl.
*G03B 17/12* (2021.01)
*G03B 7/26* (2021.01)
*G03B 17/56* (2021.01)

(52) U.S. Cl.
CPC ............... *G03B 17/12* (2013.01); *G03B 7/26* (2013.01); *G03B 17/561* (2013.01); *G03B 17/565* (2013.01)

(58) Field of Classification Search
CPC .................. G03B 17/12; G03B 17/561; G03B 2205/0069; G03B 17/565; G03B 7/26
See application file for complete search history.

(56) References Cited

U.S. PATENT DOCUMENTS

| | | | | |
|---|---|---|---|---|
| 12,510,801 B2* | 12/2025 | Lee | G03B 5/00 |
| 2018/0231793 A1* | 8/2018 | Jeong | G03B 5/00 |
| 2019/0230262 A1* | 7/2019 | Wang | G03B 5/02 |
| 2021/0278623 A1* | 9/2021 | Hsu | G02B 7/1821 |
| 2025/0116877 A1* | 4/2025 | Go | G02B 7/1821 |

* cited by examiner

*Primary Examiner* — Christopher E Mahoney
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion used for connecting an optical element, a fixed portion, and a driving assembly used for driving the movable portion to move relative to the fixed portion. The movable portion is movable relative to the fixed portion. The driving assembly is used for driving the movable portion to move relative to the fixed portion.

18 Claims, 19 Drawing Sheets

OPTICAL ELEMENT DRIVING MECHANISM

CROSS REFERENCE TO RELATED APPLICATIONS

This application claims priority of U.S. Provisional Application No. 63/457,894, filed on Apr. 7, 2023, and U.S. Provisional Application No. 63/586,074, filed on Sep. 28, 2023, the entirety of which are incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical system is provided in some embodiments. The optical system includes a movable portion used for connecting an optical element, a fixed portion, and a driving assembly used for driving the movable portion to move relative to the fixed portion. The movable portion is movable relative to the fixed portion. The driving assembly is used for driving the movable portion to move relative to the fixed portion.

In some embodiments, the optical system further includes a first sensing assembly. The first sensing assembly is used for detecting the rotation of the movable portion relative to the fixed portion taking a first rotational axis as the rotational axis. The first sensing assembly includes a first reference object and a first sensing element. The first sensing element corresponds to the first reference object. The first reference object includes a first magnetic portion and a second magnetic portion arranged along a first axis.

In some embodiments, the optical system further includes a second sensing assembly. The second sensing assembly is used for detecting the rotation of the movable portion relative to the fixed portion taking a second rotational axis as the rotational axis. The second sensing assembly includes a second reference object and a second sensing element. The second sensing element corresponds to the second reference object. The second reference object includes a third magnetic portion and a fourth magnetic portion arranged along a second axis. A maximum size of the third magnetic portion is different from a maximum size of the fourth magnetic portion in the second axis.

In some embodiments, the first axis is parallel to the second axis. A connection between centers of the second reference object and the second sensing element does not pass through the second rotational axis when viewed along the second rotational axis. A first distance is between the third magnetic portion and the second rotational axis when viewed along the second rotational axis. A second distance is between the fourth magnetic portion and the second rotational axis when viewed along the second rotational axis. The first distance and the second distance are different.

In some embodiments, a size difference between the first magnetic portion and the second magnetic portion in the first axis is different from a size difference between the third magnetic portion and the fourth magnetic portion in the second axis. A shortest distance between the first sensing assembly and the first rotational axis is different from a shortest distance between the second sensing assembly and the second rotational axis. A third distance is between the first rotational axis and a connection between centers of the first reference object and the first sensing element when viewed along the first rotational axis. A fourth distance is between the second rotational axis and a connection between centers of the second reference object and the second sensing element when viewed along the second rotational axis. The third distance is different from the fourth distance.

In some embodiments, the maximum size of the third magnetic portion is greater than the maximum size of the fourth magnetic portion in the second axis. The first distance is greater than the second distance. The third distance is less than the fourth distance. The size difference between the first magnetic portion and the second magnetic portion in the first axis is less than size difference between the third magnetic portion and the fourth magnetic portion in the second axis. The shortest distance between the first sensing assembly and the first rotational axis is less than the shortest distance between the second sensing assembly and the second rotational axis.

In some embodiments, the optical system further includes a circuit assembly. The circuit assembly includes a circuit element, a first reinforcement element, and a second reinforcement element. The fixed portion includes a case and a bottom. The first reinforcement element is disposed between the bottom and the circuit element. The second reinforcement element is disposed between the case and the circuit element. The first reinforcement element is spaced apart from the second reinforcement element. The first reinforcement element and the second reinforcement element are not magnetic permeable.

In some embodiments, the optical system further includes a first adhesive element and a second adhesive element. The first adhesive element is in direct contact with the case and the second reinforcement element. The driving assembly includes a first driving coil, a second driving coil, a third driving coil, and a third magnetic element. The first driving coil, the second driving coil, and the third driving coil correspond to the first reference object, the second reference object, and the third magnetic element, respectively. The first driving coil includes a first leading wire. The third driving coil includes a third leading wire. The second driving coil and the third driving coil are disposed on opposite sides of the movable portion. The second adhesive element is in direct contact with the case, the bottom, and the third leading wire.

In some embodiments, the optical system further includes a third adhesive element and a fourth adhesive element. The third adhesive element is in direct contact with the case and the bottom. The first reinforcement element includes a first opening when viewed along the main axis. The fourth adhesive element is disposed in the first opening. The fourth adhesive element is in direct contact with the first driving coil. The fourth adhesive element surrounds the first leading wire.

In some embodiments, the first reinforcement element includes a second opening and a third opening when viewed along the main axis. The second opening extends in a fourth axis. The third opening extends in a third axis. The second axis and the third axis are parallel. The second opening has a second length in the fourth axis and a second width in the third axis. The third opening has a third length in the third axis and a third width in the fourth axis.

In some embodiments, the second length is greater than the second width. The third length is greater than the third width. The third axis and the fourth axis are not parallel.

In some embodiments, the optical system further includes an intermediate assembly, wherein the movable portion is movable relative to the fixed portion through the intermediate assembly. The intermediate assembly includes a support element and a contact element. The contact element is in direct contact with the support element. The hardness of the support element is higher than the hardness of the contact element.

In some embodiments, the contact element includes metal. The contact element is plate-shaped. The movable portion includes a base and a strengthen assembly. The contact element is affixed on the base. The strengthen assembly is affixed on the base and the fixed portion.

In some embodiments, the hardness of the strengthen assembly is higher than the hardness of the base. The strengthen assembly is at least partially embedded in the base. The strengthen assembly is at least partially embedded in the fixed portion. The magnetic permeability of the strengthen assembly is different from the magnetic permeability of the contact element.

In some embodiments, the magnetic permeability of the strengthen assembly is greater than the magnetic permeability of the contact element. The strengthen assembly includes metal. The base includes plastic or rubber.

In some embodiments, the strengthen assembly includes a first strengthen element and a second strengthen element. The first strengthen element is spaced apart from the second strengthen element. The first strengthen element and the second strengthen element are disposed on opposite sides of the support element. The contact element is disposed between the support element and the second strengthen element.

In some embodiments, the contact element is in direct contact with the second strengthen element and the support element. The second strengthen element is in direct contact with the first reference object. A thickness of the second strengthen element is different from a thickness of the contact element.

In some embodiments, the thickness of the second strengthen element is less than the thickness of the contact element. The optical element driving mechanism further includes a resilient element disposed between the movable portion and the fixed portion. The resilient element includes a plurality of wiring portions, a connecting portion, and an opening. The connecting portion connects the wiring portions. The opening and the connecting portion are at opposite sides of the support element when viewed along the third axis. The support element and the connecting portion are not overlap each other when viewed along the third axis.

In some embodiments, the optical system further includes a support element and a plurality of resilient elements, the movable portion includes a strengthen assembly, and the strengthen assembly includes a first strengthen element and the second strengthen element. The movable portion is movable relative to the fixed portion through the support element. The first strengthen element and the second strengthen element are disposed on opposite sides of the support element.

In some embodiments, the second strengthen element is in direct contact with the support element and the first reference object. The resilient elements are disposed between the movable portion and the fixed portion. The resilient elements are spaced apart from each other.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
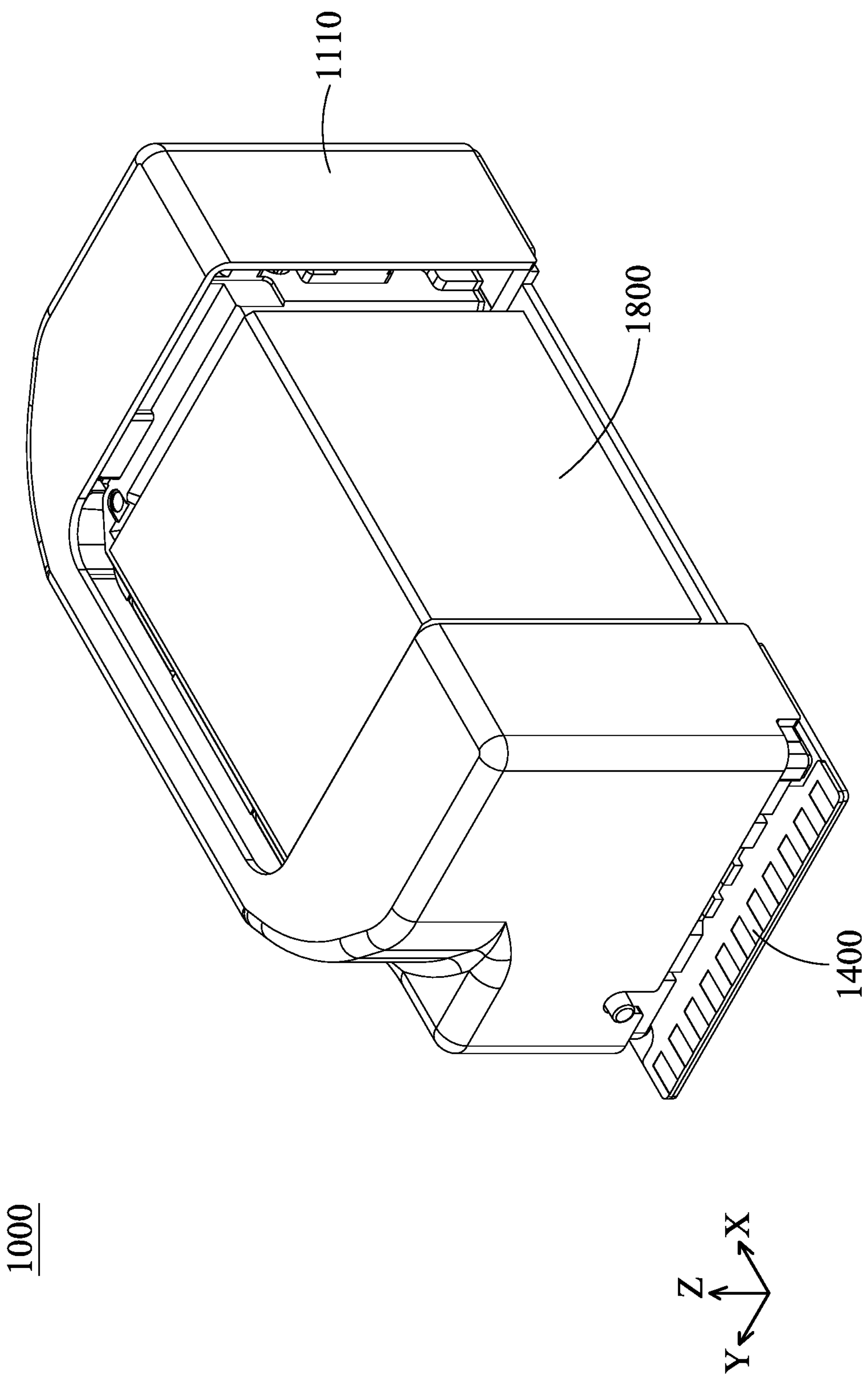
FIG. 1A is a schematic view of an optical element driving mechanism.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
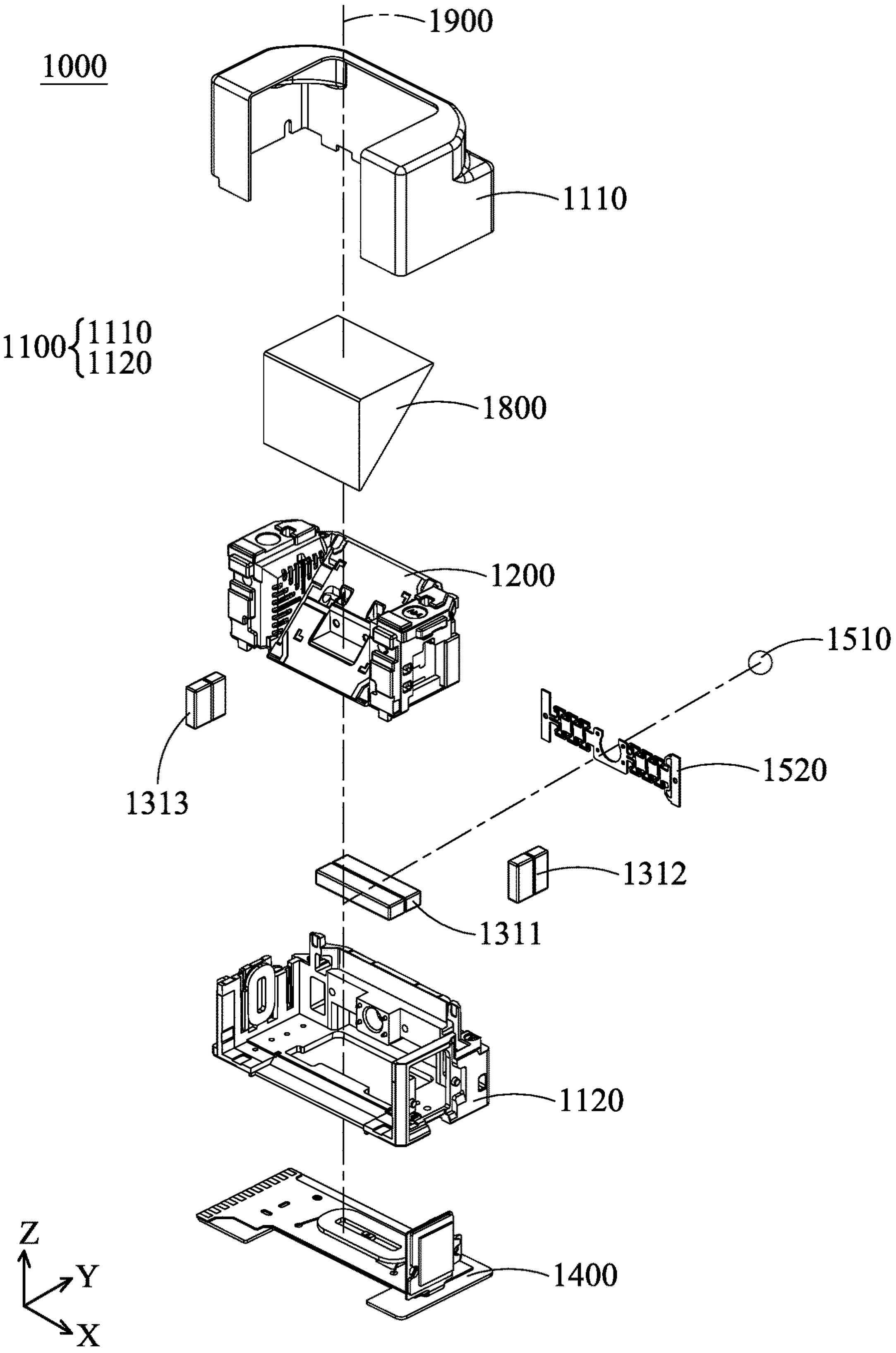
FIG. 1B is an exploded view of the optical element driving mechanism.
Figure 1C:
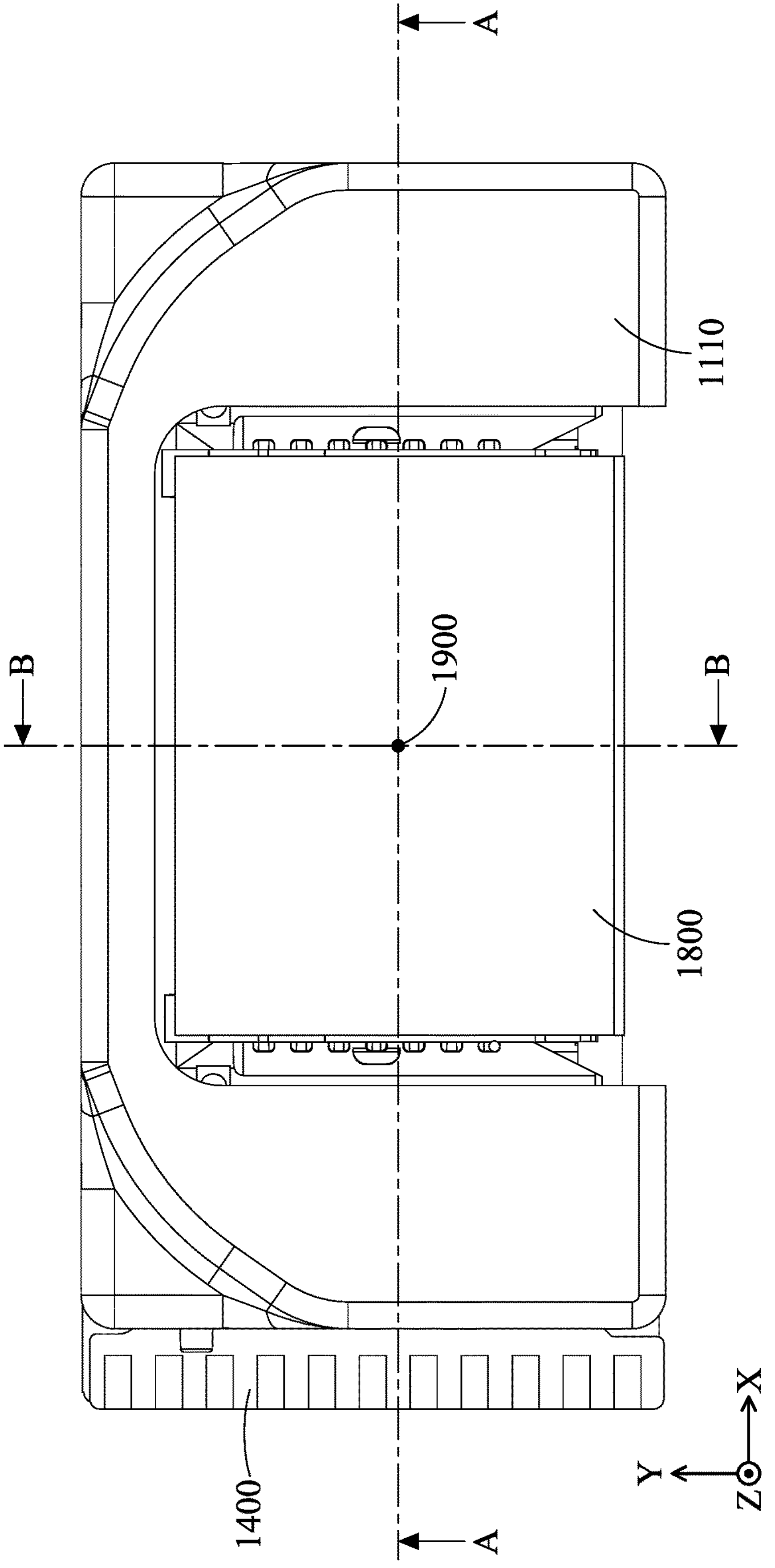
FIG. 1C is a top view of the optical element driving mechanism.
Figure 1D:
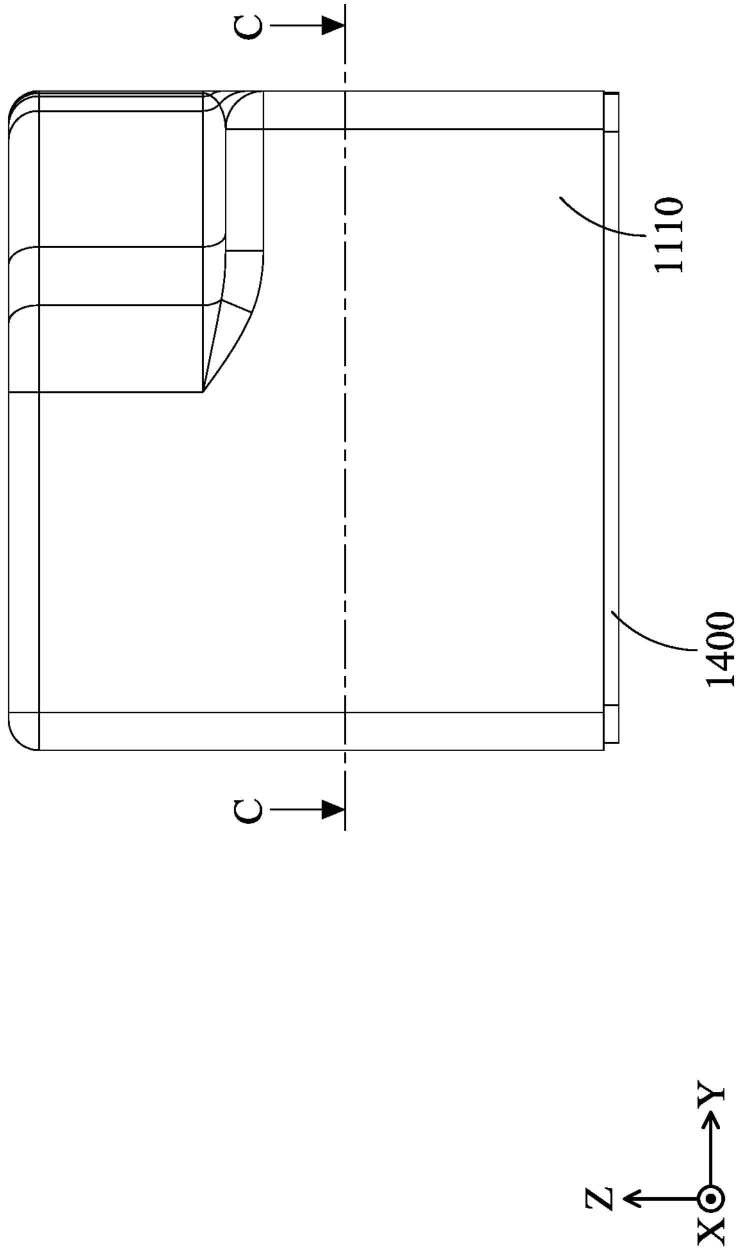
FIG. 1D is a side view of the optical element driving mechanism.
Figure 2A:
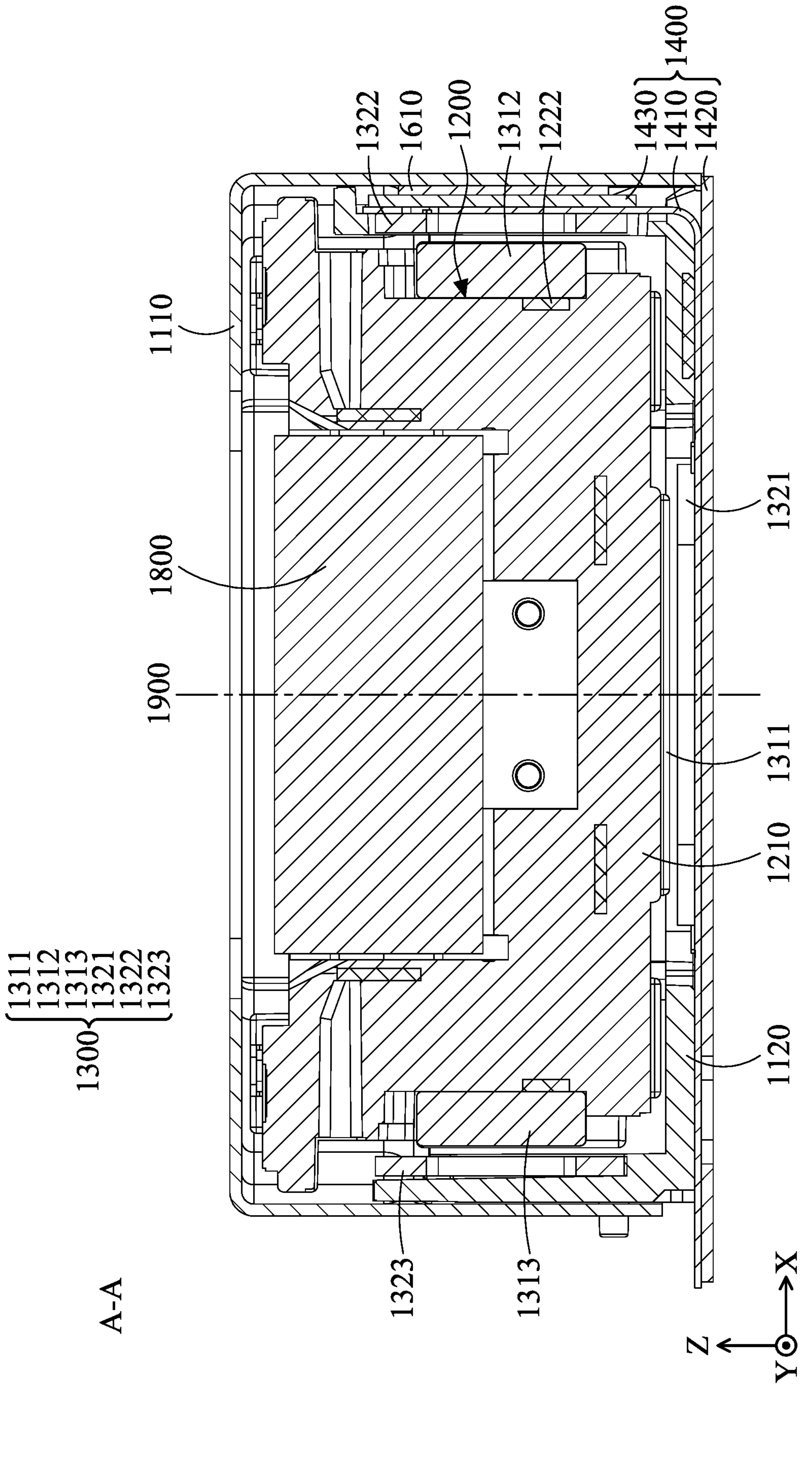
FIG. 2A is a cross-sectional view illustrated along the line A-A in FIG. 1C.
Figure 2B:
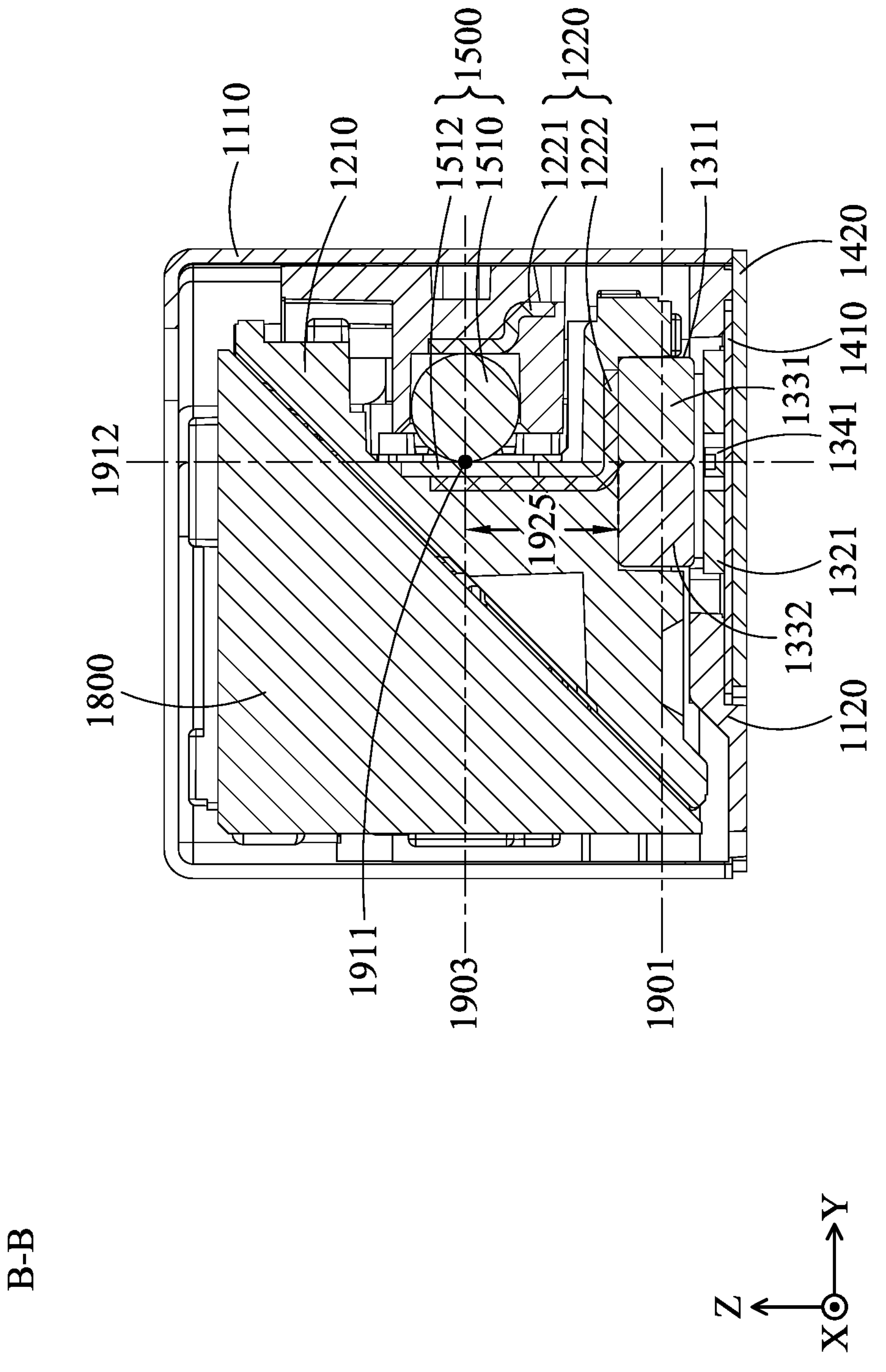
FIG. 2B is a cross-sectional view illustrated along the line B-B in FIG. 1C.
Figure 2C:
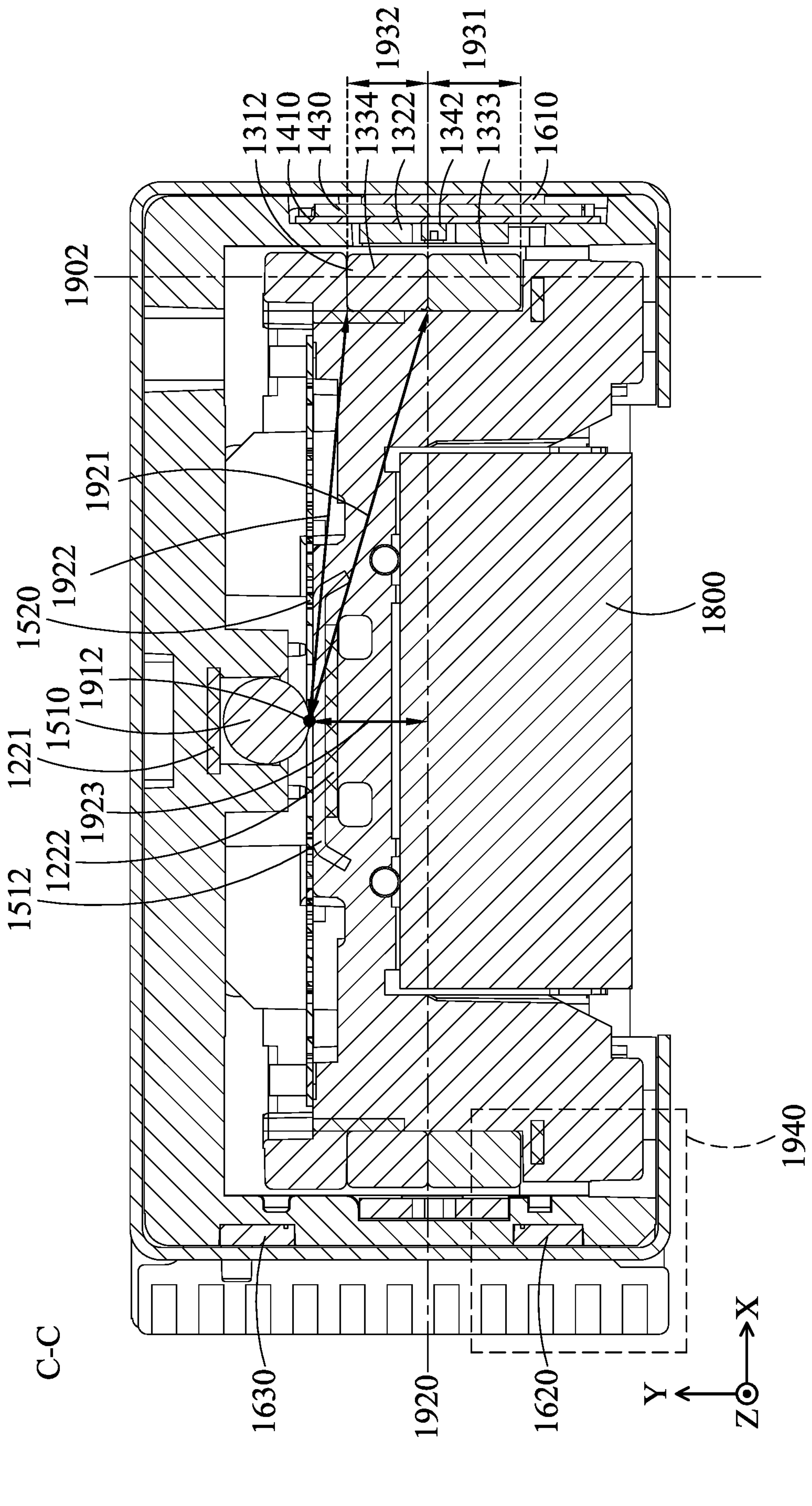
FIG. 2C is a cross-sectional view illustrated along the line C-C in FIG. 1D.

An optical element driving mechanism is provided in some embodiments of the present disclosure to drive an optical element to move. For example, FIG. 1A is a schematic view of an optical element driving mechanism 1000. FIG. 1B is an exploded view of the optical element driving mechanism 1000. FIG. 1C is a top view of the optical element driving mechanism 1000. FIG. 1D is a side view of the optical element driving mechanism 1000. FIG. 2A is a cross-sectional view illustrated along the line A-A in FIG. 1C. FIG. 2B is a cross-sectional view illustrated along the line B-B in FIG. 1C. FIG. 2C is a cross-sectional view illustrated along the line C-C in FIG. 1D.

As shown in FIG. 1A to FIG. 2C, the optical element driving mechanism 1000 may mainly include a fixed portion 1100, a movable portion 1200, a driving assembly 1300, a circuit assembly 1400, an intermediate assembly 1500, and a resilient element 1520 arranged along a main axis 1900 to hold and move the optical element 1800.

In some embodiments, the optical element 1800 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the fixed portion 1110 and the bottom 1120 may be combined with each other to form a shell of the optical element driving mechanism 1000. Other elements of the optical element driving mechanism 1000 may be disposed in the shell formed by the fixed portion 1110 and the bottom 1120 to protect other elements. For example, the bottom 1120 may be affixed on the fixed portion 1110.

In some embodiments, the movable portion 1200 may be disposed in the fixed portion 1100 and connect to the optical element 1800, so the optical element 1800 can move with the movable portion 1200 relative to the fixed portion 1100.

In some embodiments, the driving assembly 1300 may be used for driving the movable portion 1200 to move relative to the fixed portion 1100. For example, the driving assembly 1300 may include a first magnetic element 1311, a second magnetic element 1312, a third magnetic element 1313, a first driving coil 1321, a second driving coil 1322, and a third driving coil 1323. The first magnetic element 1311, the second magnetic element 1312, and the third magnetic element 1313 may be disposed on the movable portion 1200, and the first driving coil 1321, the second driving coil 1322, and the third driving coil 1323 may be disposed on the fixed portion 1100 (such as may be disposed on the fixed portion 1110, as shown in FIG. 1D). When current is provided to the first driving coil 1321, the second driving coil 1322, and the third driving coil 1323, they will respectively interact with the magnetic field generated by the first magnetic element 1311, the second magnetic element 1312, and the third magnetic element 1313 to generate an electromagnetic force to drive the movable portion 1200 and the optical element 1800 moving relative to the fixed portion 1100, thereby achieving auto focus (AF) or optical image stabilization (OIS). In some embodiments, the first magnetic element 1311, the second magnetic element 1312, and the third magnetic element 1313 may be disposed on the fixed portion 1100, and the first driving coil 1321, the second driving coil 1322, and the third driving coil 1323 may be disposed on the movable portion 1200, depending on design requirement.

In some embodiments, the movable portion 1200 and the first driving coil 1321 may arrange along the main axis 1900, and the second driving coil 1322 and the third driving coil 1323 may be disposed on opposite sides of the movable portion 1200 and arrange along the X axis perpendicular to the main axis 1900.

In some embodiments, the circuit assembly 1400 may include a circuit element 1410, a first strengthen element 1420, and a second strengthen element 1430. The circuit element 1410 may be a flexible printed circuit (FPC), the driving assembly 1300 may be affixed on the circuit element 1410 by adhesion, and the circuit element 1410 may be disposed between the fixed portion 1100 and the movable portion 1200.

In this embodiment, the circuit element 1410 is electrically connected to other electronic elements inside or outside the optical element driving mechanism 1000. For example, the circuit element 1410 may provide electrical signal to the first driving coil 1321, the second driving coil 1322, and the third driving coil 1323 to control the movement of the movable portion 1200 in different axes, thereby achieving auto focus or optical image stabilization.

In some embodiments, the first strengthen element 1420 and the second strengthen element 1430 may be disposed on the circuit element 1410, they may include metal and non-magnetic permeable material to increase the mechanical strength of the circuit element 1410, and magnetic interference may be prevented. In some embodiments, as shown in FIG. 2B and FIG. 2C, when viewed along the Z axis, the circuit element 1410 is disposed between the bottom 1120 and the first strengthen element 1420. When viewed along the −Z axis, the bottom of the bottom 1120 partially overlaps the circuit element 1410 and the first strengthen element 1420 (the circuit element 1410 may be disposed between the bottom 1120 and the first strengthen element 1420), and the second strengthen element 1430 may be disposed between the fixed portion 1110 and the circuit element 1410.

In some embodiments, the resilient element 1520 may include metal and may be disposed between the fixed portion 1100 and the movable portion 1200 to movably connect to the fixed portion 1100 and the movable portion 1200, thereby allowing the movable portion 1200 and the optical element 1800 disposed on the movable portion 1200 to move relative to the fixed portion 1100.

In some embodiments, the movable portion 1200 is movable relative to the fixed portion 1100 through the intermediate assembly 1500. The intermediate assembly 1500 may include a support element 1510 and a contact element 1512 in direct contact with the support element 1510, and the hardness of the support element 1510 may be greater than the hardness of the contact element 1512. The movable portion 1200 is movable relative to the fixed portion 1100 through the intermediate assembly 1500, such as the support element 1510 may include a sphere surface and may be affixed on one of the fixed portion 1100 and the movable portion 1200, and is movable relative to another one of the fixed portion 1100 and the movable portion 1200 to reduce the friction between the fixed portion 1100 and the movable portion 1200. In some embodiments, the support element 1510 may include ceramic, and the contact element 1512 may include metal and may be plate-shaped.

In some embodiments, as shown in FIG. 2A and FIG. 2B, the movable portion 1200 may include a base 1210 and a strengthen assembly 1220, the strengthen assembly 1220 may be affixed in the base 1210, and the contact element 1512 may also be affixed in the base 1210, such as at least partially embedded in the base 1210. In some embodiments, the hardness of the strengthen assembly 1220 is greater than the hardness of the base 1210, such as the strengthen assembly 1220 may include metal, and the base 1210 may include plastic or rubber. By disposing the strengthen assembly 1220 in the base 1210, the mechanical strength of the movable portion 1200 may be increased.

In some embodiments, the strengthen assembly 1220 may be adjacent to the driving assembly 1300, and the strengthen assembly 1220 and the contact element 1512 may include different materials. In some embodiments, the magnetic permeability of the strengthen assembly 1220 may be different from the magnetic permeability of the contact element 1512, such as the magnetic permeability of the strengthen assembly 1220 may be greater than the magnetic permeability of the contact element 1512.

In some embodiments, as shown in FIG. 2B and FIG. 2C, a first sensing element 1341 and a second sensing element 1342 may be disposed on the circuit element 1410 and may be respectively in the first driving coil 1321 and the second driving coil 1322 to detect the magnetic field variation of the first magnetic element 1311 and the second magnetic element 1312 when the movable portion 1200 moves relative to the fixed portion 1100, so the position of the movable portion 1200 relative to the fixed portion 1100 may be achieved. Therefore, the first magnetic element 1311 and the second magnetic element 1312 may be called as a first reference object and a second reference object, and the first sensing element 1341 and the second sensing element 1342 may respectively correspond to the first reference object and the second reference object. Moreover, the first driving coil 1321, the second driving coil 1322, and the third driving coil 1323 may correspond to the first reference object, the second reference object, and the third magnetic element 1313, respectively.

In some embodiments, the first sensing element 1341 and the second sensing element 1342 may a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the first magnetic element 1311 (the first reference object) and the first sensing element 1341 may be called as a first sensing assembly, and the second magnetic element 1312 (the second reference object) and the second sensing element 1342 may be called as a second sensing assembly. The first sensing assembly may be used for detecting the rotation of the movable portion 1200 relative to the fixed portion 1100 with a first rotational axis 1911 as its rotational axis, and the second assembly may be used for detecting the rotation of the movable portion 1200 relative to the fixed portion 1100 with a second rotational axis 1912 as its rotational axis. In some embodiments, the first rotational axis 1911 and the second rotational axis 1912 may be not parallel, such as may be perpendicular. In some embodiments, the first rotational axis 1911 may be an axis passing a contact point between the support element 1510 and the contact element 1512 and parallel to the X axis. In some embodiments, the second rotational axis 1912 may be an axis passing a contact point between the support element 1510 and the contact element 1512 and parallel to the Z axis.

In some embodiments, the first magnetic element 1311 (the first reference object) may include a first magnetic portion 1331 and a second magnetic portion 1332, and the second magnetic element 1312 (the second reference object) may include a third magnetic portion 1333 and a fourth magnetic portion 1334. In some embodiments, the first magnetic portion 1331 and the second magnetic portion 1332 may arrange along a first axis 1901, and the third magnetic portion 1333 and the fourth magnetic portion 1334 may arrange along a second axis 1902. In some embodiments, the first axis 1901 and the second axis 1902 may be parallel, such as parallel to the Y axis.

In some embodiments, as shown in FIG. 2C, when viewed along the second rotational axis 1912, a connection 1920 connecting the center of the second magnetic element 1312 (the second reference object) and the center of the second sensing element 1342 does not pass the second rotational axis 1912. Moreover, when viewed along the second rotational axis 1912, a first distance 1921 is between the third magnetic portion 1333 and the second rotational axis 1912, a second distance 1922 is between the fourth magnetic portion 1334 and the second rotational axis 1912, and the first distance 1921 and the second distance 1922 are different, such as the first distance 1921 may be greater than the second distance 1922. Therefore, the third magnetic portion 1333 and the fourth magnetic portion 1334 may have different sizes in the second axis 1902 to balance the error caused by the asymmetry. Specifically, the maximum size of the third magnetic portion 1333 may be a first size 1931, the maximum size of the fourth magnetic portion 1334 may be a second size 1932, and the first size 1931 and the second size 1932 may be different, such as the first size 1931 may be greater than the second size 1932. In this way, the sensing errors that may be caused by the aforementioned asymmetry can be offset.

In some embodiments, as shown in FIG. 2B, a line connecting the centers of the first magnetic element 1311 and the second sensing element 1342 (e.g. the second rotational axis 1912) may pass the first rotational axis 1911, so the aforementioned asymmetry does not occur. Therefore, the sizes of the first magnetic portion 1331 and the second magnetic portion 1332 may be substantially identical in the first axis 1901 to balance the magnetic fields in different directions and increase the sensing accuracy. In other words, the size difference between the first magnetic portion 1331 and the second magnetic portion 1332 in the first axis 1901 is different from the size difference between the third magnetic portion 1333 and the fourth magnetic portion 1334 in the second axis 1902, such as the size difference between the first magnetic portion 1331 and the second magnetic portion 1332 in the first axis 1901 may be less than the size difference between the third magnetic portion 1333 and the fourth magnetic portion 1334 in the second axis 1902

In some embodiments, as shown in FIG. 2B, when viewed along the first rotational axis 1911, a connection between the center of the first magnetic element 1311 (the first reference object) and the center of the first sensing element 1341 has a third distance to the first rotational axis 1911. When viewed along the second rotational axis 1912, a connection 1920 between the center of the second magnetic element 1312 (the second reference object) and the center of the second sensing element 1342 has a fourth distance 1923 to the first rotational axis 1911, and the third distance may be different from the fourth distance 1923. In some embodiments, the third distance is less than the fourth distance 1923. In some embodiments, the third distance may be zero.

In some embodiments, as shown in FIG. 2B and FIG. 2C, the smallest distance between the first sensing assembly and the first rotational axis 1911 is different from the smallest distance between the second sensing assembly and the second rotational axis 1912. For example, the smallest distance between the first sensing assembly and the first rotational axis 1911 is a minimum distance 1925 between the first magnetic element 1311 and the first rotational axis 1911 in the Z axis shown in FIG. 2B, and the smallest distance between the second sensing assembly and the second rotational axis 1912 is the second distance 1922 in FIG. 2C, and the second distance 1922 and the minimum distance 1925 are different. In some embodiments, the minimum distance 1925 is less than the second distance 1922. Since the third magnetic portion 1333 and the fourth magnetic portion 1334 in the second axis 1902 has a greater size difference, the sensing error caused by the distance difference may be reduced, and higher driving and sensing accuracy may be achieved.

Figure 2D:
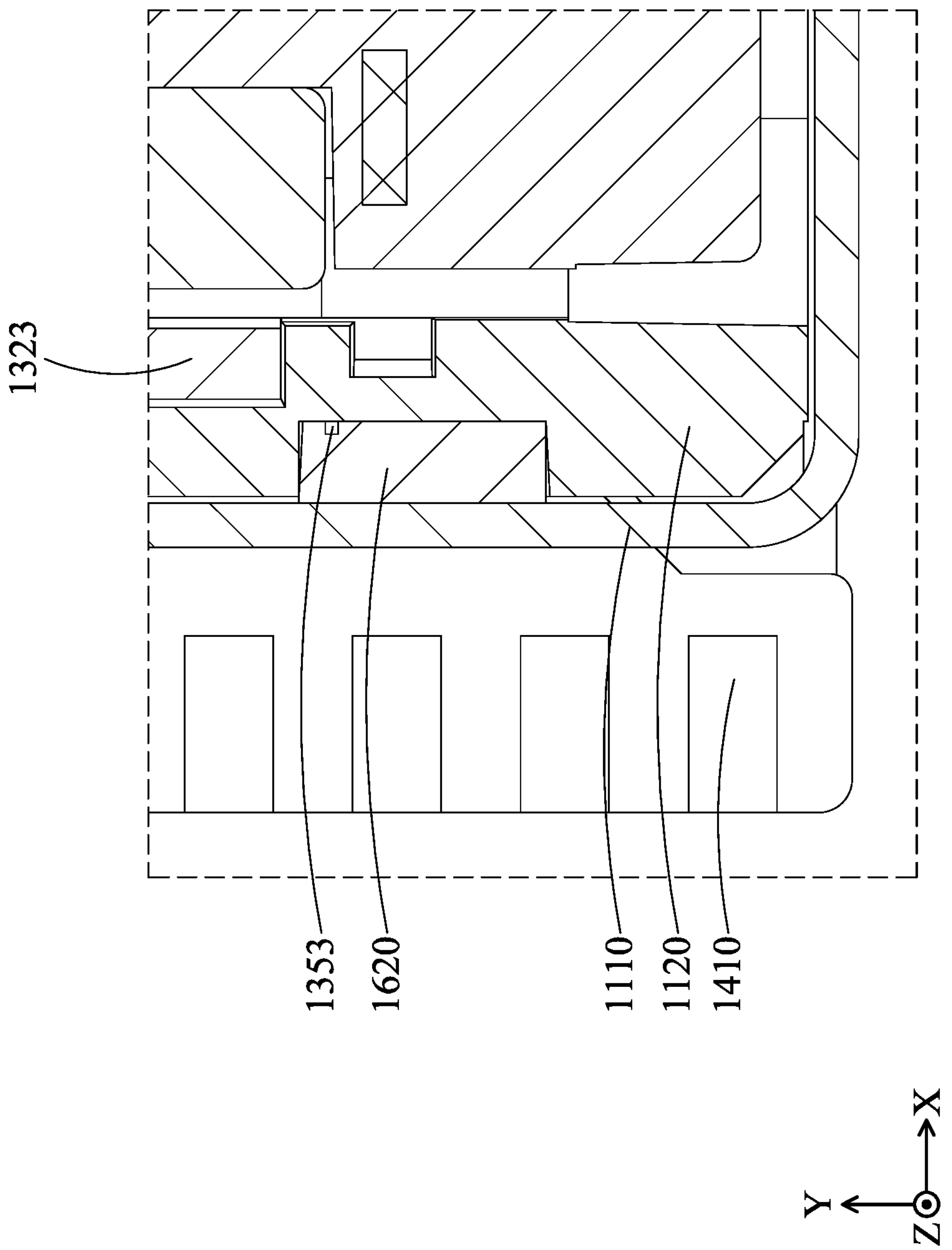
FIG. 2D is an enlarged view of the region in FIG. 2C.
Figure 3A:
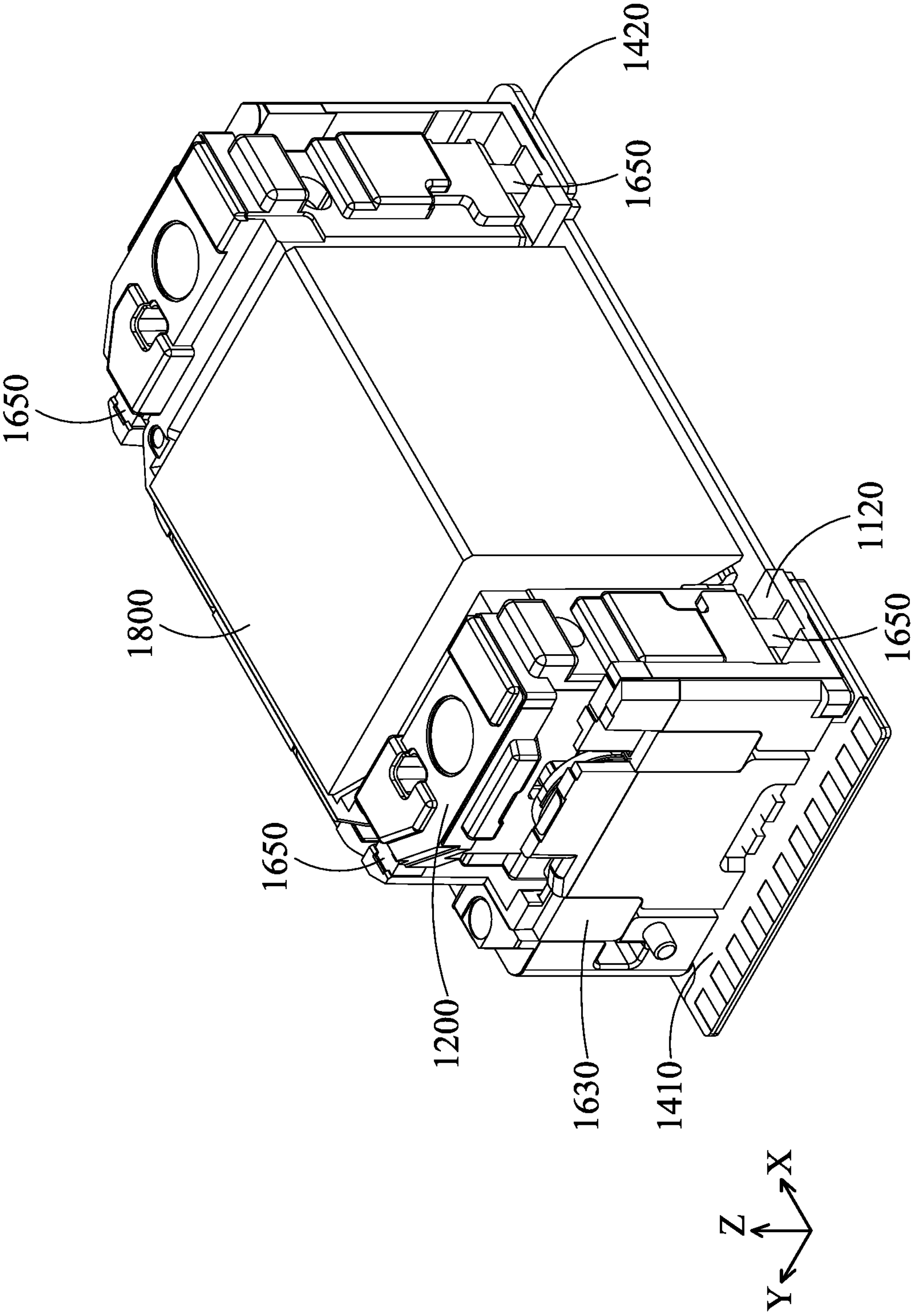
FIG. 3A, FIG. 3B, and FIG. 3C are schematic views of some elements of the optical element driving mechanism viewed from different directions.
Figure 3B:
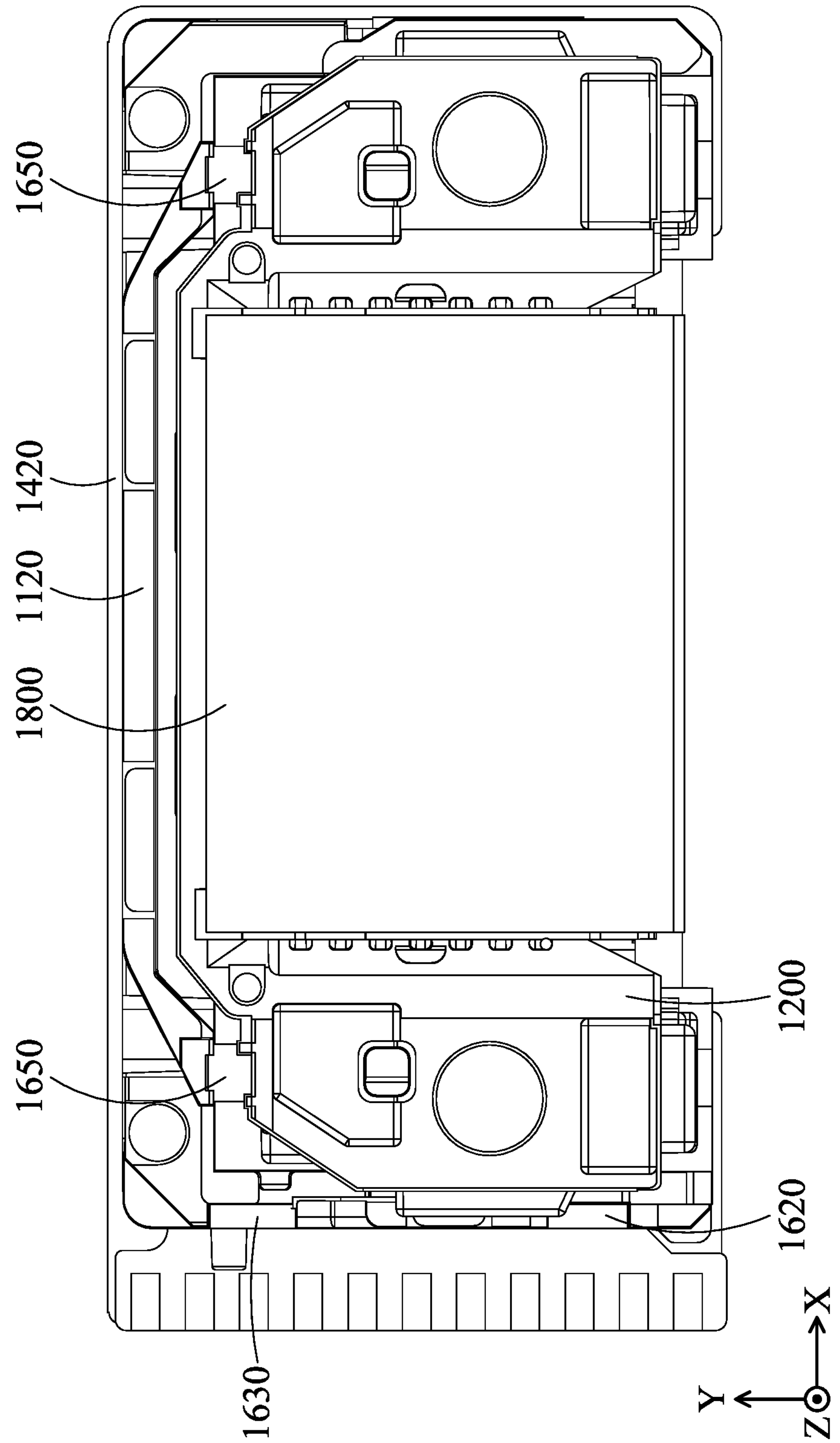
Figure 3C:
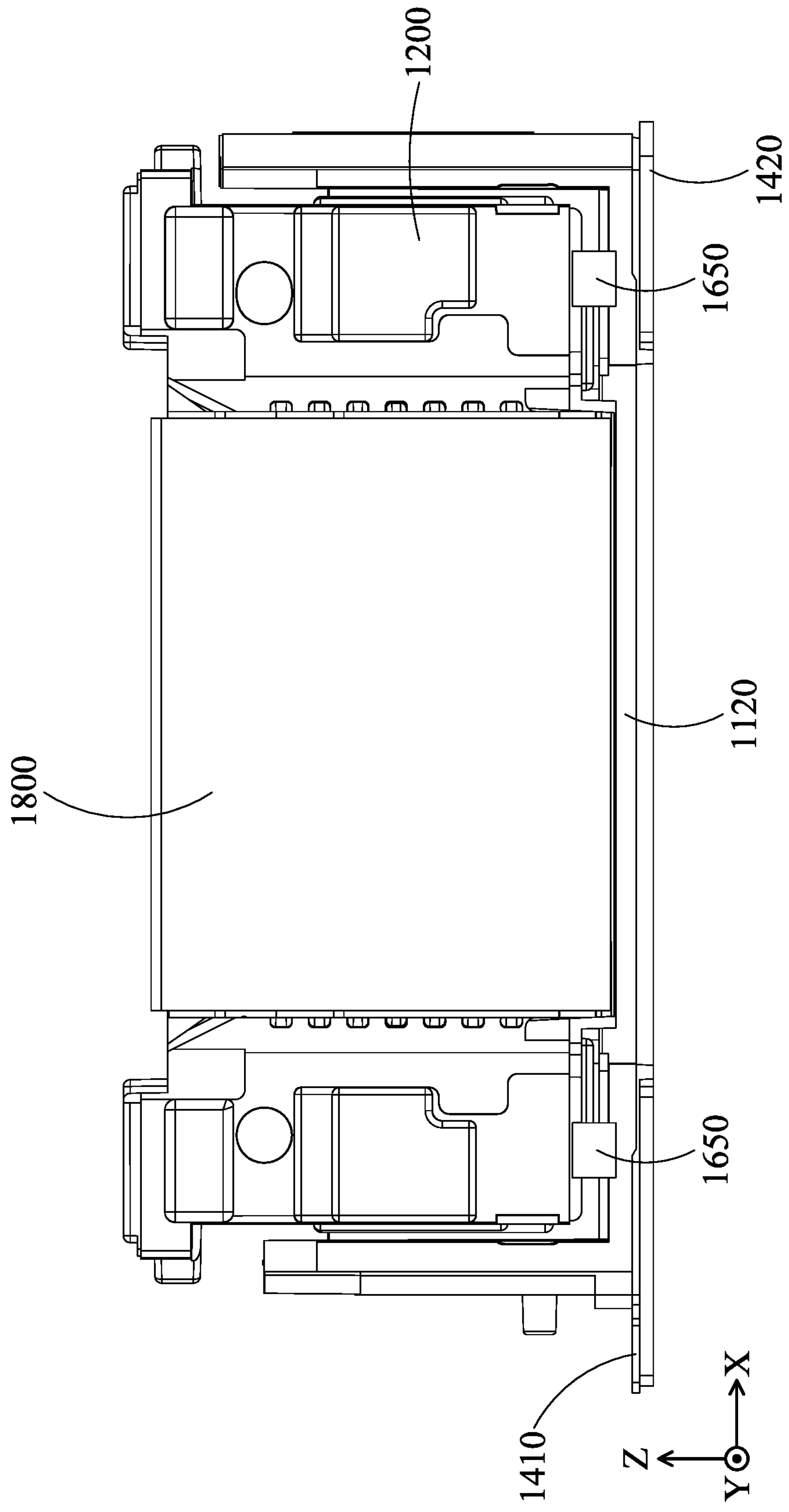

FIG. 2D is an enlarged view of the region 1940 in FIG. 2C. FIG. 3A, FIG. 3B, and FIG. 3C are schematic views of some elements of the optical element driving mechanism 1000 viewed from different directions. As shown in FIG. 2A, FIG. 2C, FIG. 2D, FIG. 3A, FIG. 3B, and FIG. 3C, the optical element driving mechanism 1000 may further include a first adhesive element 1610, a second adhesive element 1620, and a third adhesive element 1630. In some embodiments, the first adhesive element 1610, the second adhesive element 1620, and the third adhesive element 1630 may include adhesive materials such as light-curing adhesive or thermosetting adhesive. In some embodiments, the first adhesive element 1610 may be in direct contact with the second strengthen element 1430 and the fixed portion 1110 to affix the second strengthen element 1430 on the fixed portion 1110. In some embodiments, the second adhesive element 1620 and the third adhesive element 1630 may be disposed on an identical side of the bottom 1120 and may be in direct contact with the fixed portion 1110 and the bottom 1120, so the relative position between the fixed portion 1110 and the bottom 1120 may be fixed.

In some embodiments, as shown in FIG. 2D, the third driving coil 1323 may include a third leading wire 1353, and the second adhesive element 1620 may be in direct contact with the fixed portion 1110 and the bottom 1120, and additionally in direct contact with the third leading wire 1353, such as the third leading wire 1353 may be surrounded in the second adhesive element 1620 to protect the third leading wire 1353, thereby increases the durability of the optical element driving mechanism 1000.

In some embodiments, as shown in FIG. 3A, FIG. 3B, and FIG. 3C, a plurality of buffering elements 1650 may be disposed between the bottom 1120 and the movable portion 1200 to absorb abnormal vibration when the movable portion 1200 moving relative to the fixed portion 1100. In some embodiments, the buffering elements 1650 may include damping gel. In some embodiments, when viewed along the Z axis, as shown in FIG. 3B, a portion of the buffering elements 1650 is between the bottom 1120 and the movable portion 1200 in the Y axis. In some embodiments, when viewed along the Y axis, as shown in FIG. 3C, a portion of the buffering elements 1650 may be between the bottom 1120 and the movable portion 1200 in the Z axis.

Figure 4A:
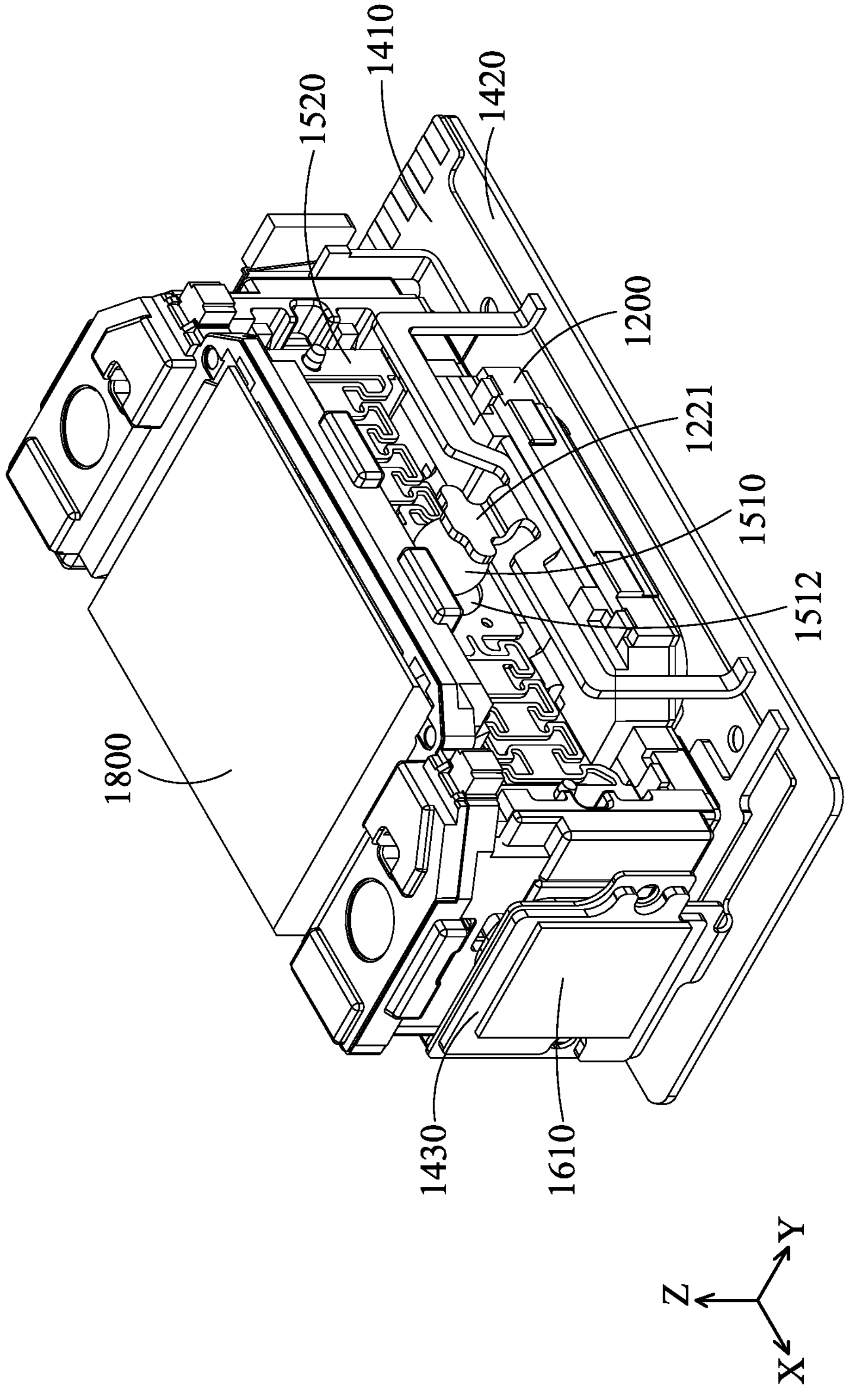
FIG. 4A and FIG. 4B are schematic views of some elements of the optical element driving mechanism viewed from different directions.
Figure 4B:
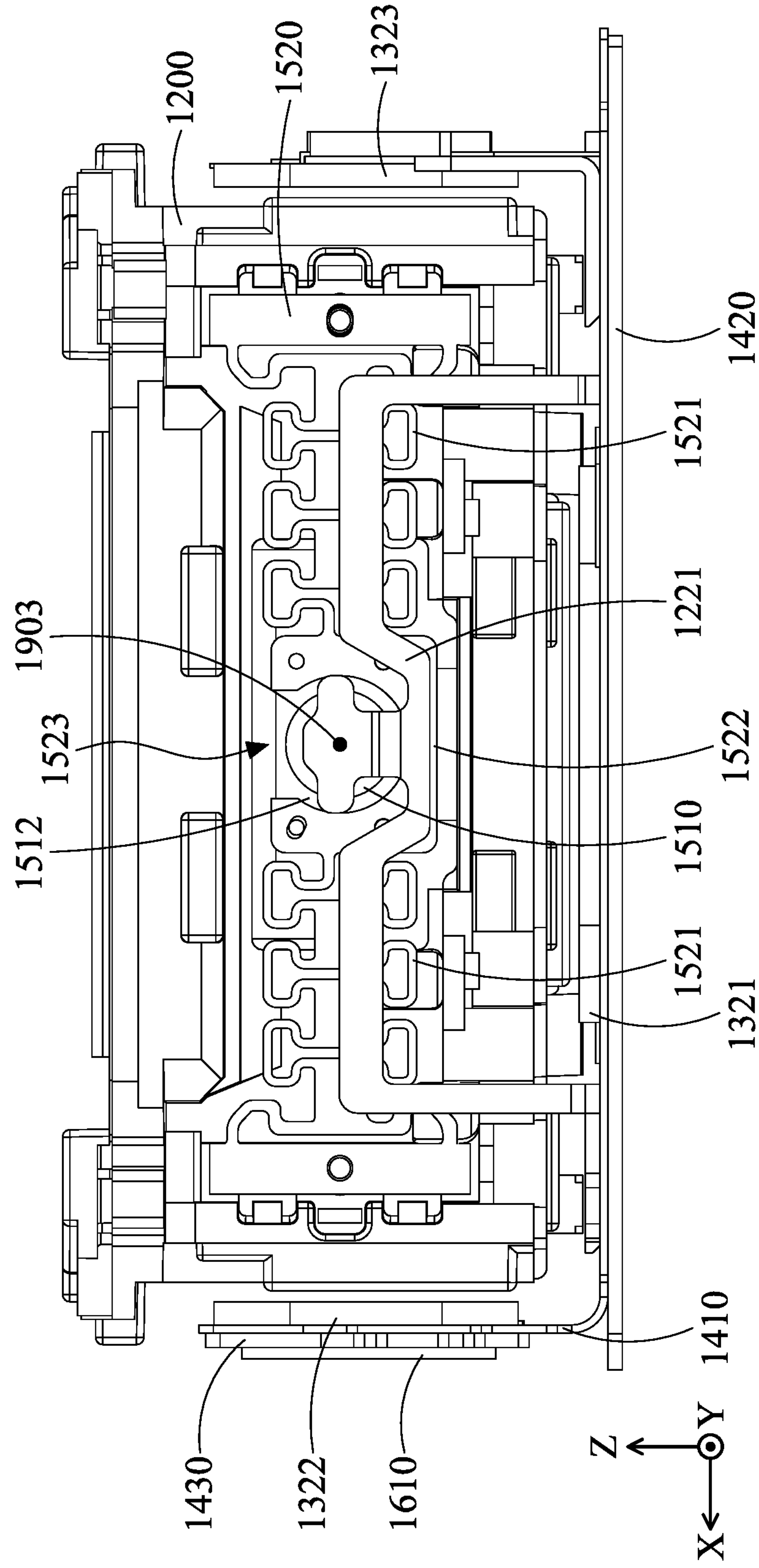

FIG. 4A and FIG. 4B are schematic views of some elements of the optical element driving mechanism 1000 viewed from different directions. As shown in FIG. 4A and FIG. 4B, the first strengthen element 1420 may be spaced apart from the second strengthen element 1430, such as the first strengthen element 1420 and the second strengthen element 1430 may be plate-shaped and may have normal vectors toward different directions, such as the normal vectors of the first strengthen element 1420 and the second strengthen element 1430 may be perpendicular.

As shown in FIG. 4B, when viewed along the third axis 1903, the resilient element 1520 may include a plurality of wiring portions 1521, a connecting portion 1522, and an opening 1523. The connecting portion 1522 may connect the wiring portions 1521, the connecting portion 1522 and the opening 1523 may be at opposite sides of the support element 1510, and the support element 1510 does not overlap the connecting portion 1522. Therefore, the size of the resilient element 1520 near the support element 1510 may be reduced to achieve miniaturization.

In some embodiments, as shown in FIG. 2B, FIG. 2C, FIG. 4A, and FIG. 4B, the strengthen assembly 1220 may include a first strengthen element 1221 and a second strengthen element 1222 separated from each other and respectively disposed in the bottom 1120 and the base 1210, such as respectively partially embedded in the bottom 1120 and the base 1210, and the first strengthen element 1221 and the second strengthen element 1222 may be disposed on opposite sides of the support element 1510 and the contact element 1512 to strengthen the mechanical strength of the bottom 1120 and the base 1210.

In some embodiments, as shown in FIG. 2B, the contact element 1512 may be in direct contact with the support element 1510 and the second strengthen element 1222, such as may be affixed on the second strengthen element 1222 and move relative to the support element 1510. The support element 1510 is affixed on the first strengthen element 1221 in this situation. In some embodiments, the support element 1510 may be affixed on the contact element 1512 and may move relative to the first strengthen element 1221. In some embodiments, the second strengthen element 1222 may be in direct contact with the first magnetic element 1311. In some embodiments, the second strengthen element 1222 and the contact element 1512 may be plate-shaped and may have different thicknesses, such as the thickness of the second strengthen element 1222 may be less than the thickness of the contact element 1512 to increase the strength of the contact element 1512.

Figure 5:
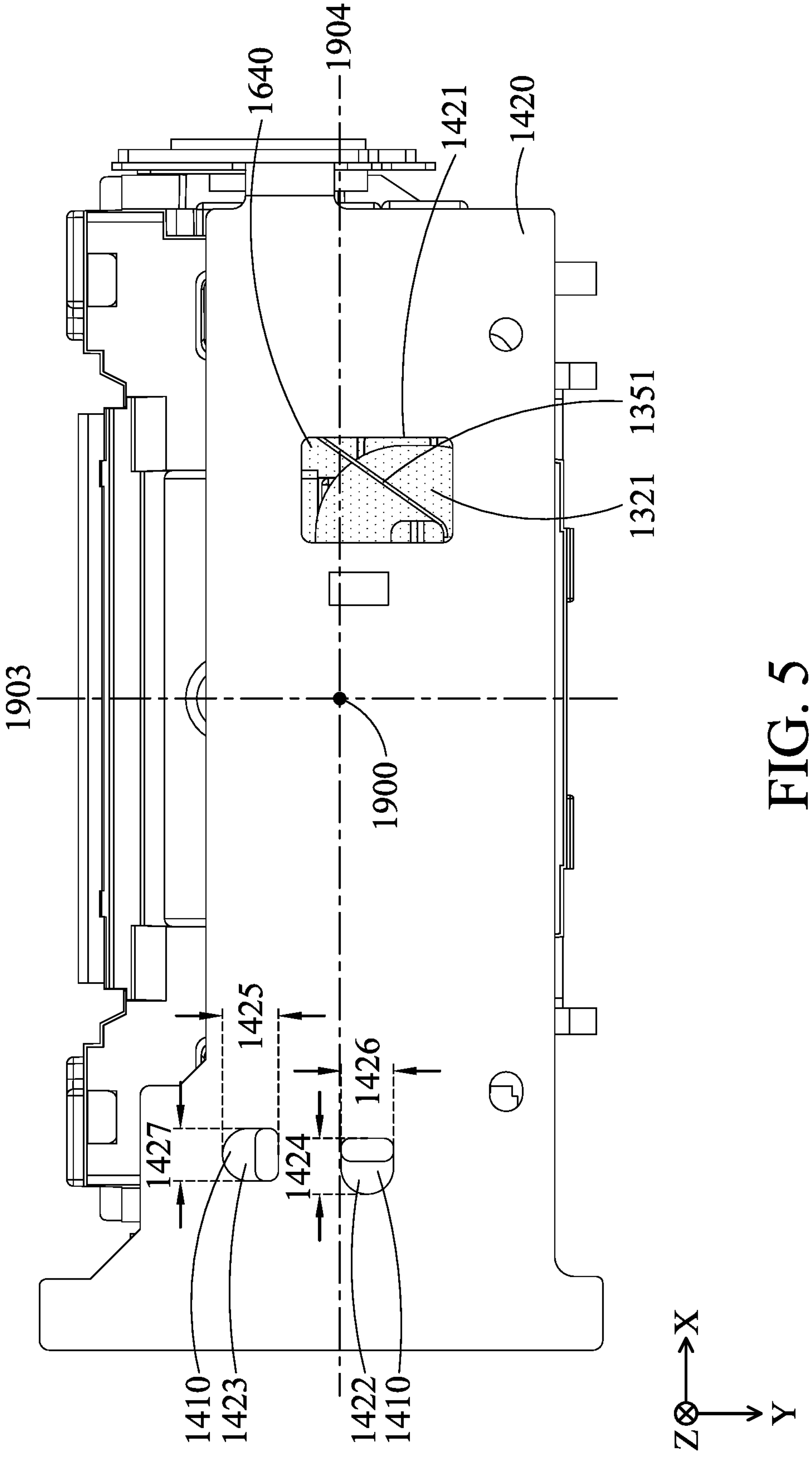
FIG. 5 is a bottom view of some elements of the optical element driving mechanism.

FIG. 5 is a bottom view of some elements of the optical element driving mechanism 1000. In some embodiments, as shown in FIG. 5, the first strengthen element 1420 may include a first opening 1421, and the fourth adhesive element 1640 may be disposed in the first opening 1421. The first driving coil 1321 may include a first leading wire 1351, and the first leading wire 1351 may at least partially overlap the fourth adhesive element 1640 when viewed along the main axis 1900, such as the first leading wire 1351 is surrounded by the fourth adhesive element 1640 to protect the first leading wire 1351.

In some embodiments, as shown in FIG. 5, when viewed along the main axis 1900, the first strengthen element 1420 may further include a second opening 1422 and a third opening 1423. A portion of the circuit element 1410 may be exposed from the second opening 1422 and the third opening 1423, such as the pads on the circuit element 1410, thereby allowing the circuit element 1410 being welded to other elements through the second opening 1422 and the third opening 1423. In some embodiments, the second opening 1422 and the third opening 1423 may be strip-shaped, such as the second opening 1422 may extend along a fourth axis 1904, and the third opening 1423 may extend along a third axis 1903. In some embodiments, the third axis 1903 and the fourth axis 1904 are not parallel, such as may be perpendicular to each other. In some embodiments, the third axis 1903 may be parallel to the Y axis, and the fourth axis 1904 may be parallel to the X axis.

Particularly, in some embodiments, as shown in FIG. 5, when viewed along the main axis 1900, the second opening 1422 has a second length 1424 on the fourth axis 1904 and has a second width 1426 on the fourth axis 1904, the third opening 1423 has a third length 1425 on the third axis 1903 and has a third width 1427 on the fourth axis 1904, the second length 1424 is greater than the second width 1426, and the third length 1425 is greater than the third width 1427. In some embodiments, the second opening 1422 and the third opening 1423 may have arc-shaped sides to fit the shape of the solder balls.

Figure 6A:
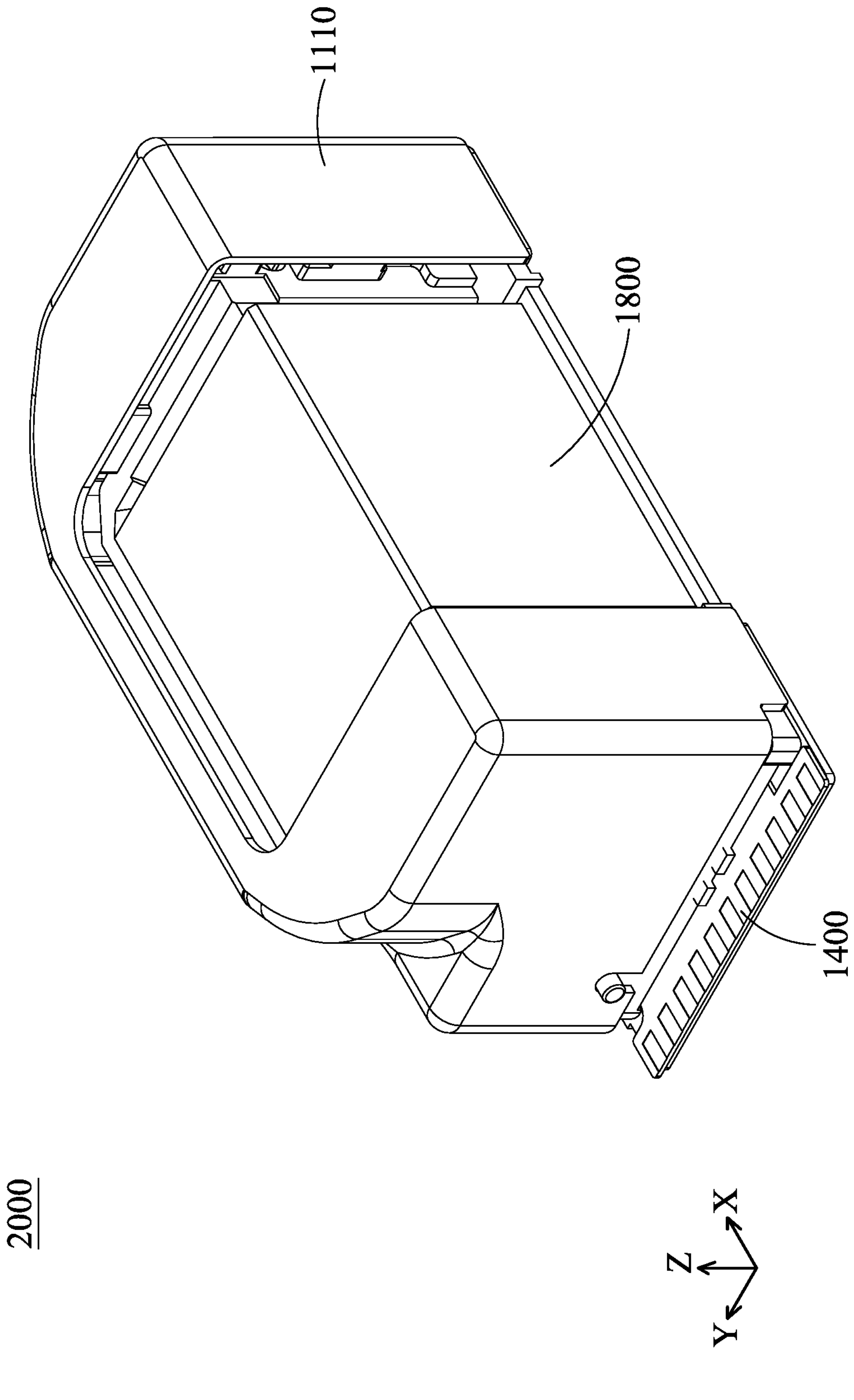
FIG. 6A is a schematic view of an optical element driving mechanism.
Figure 6B:
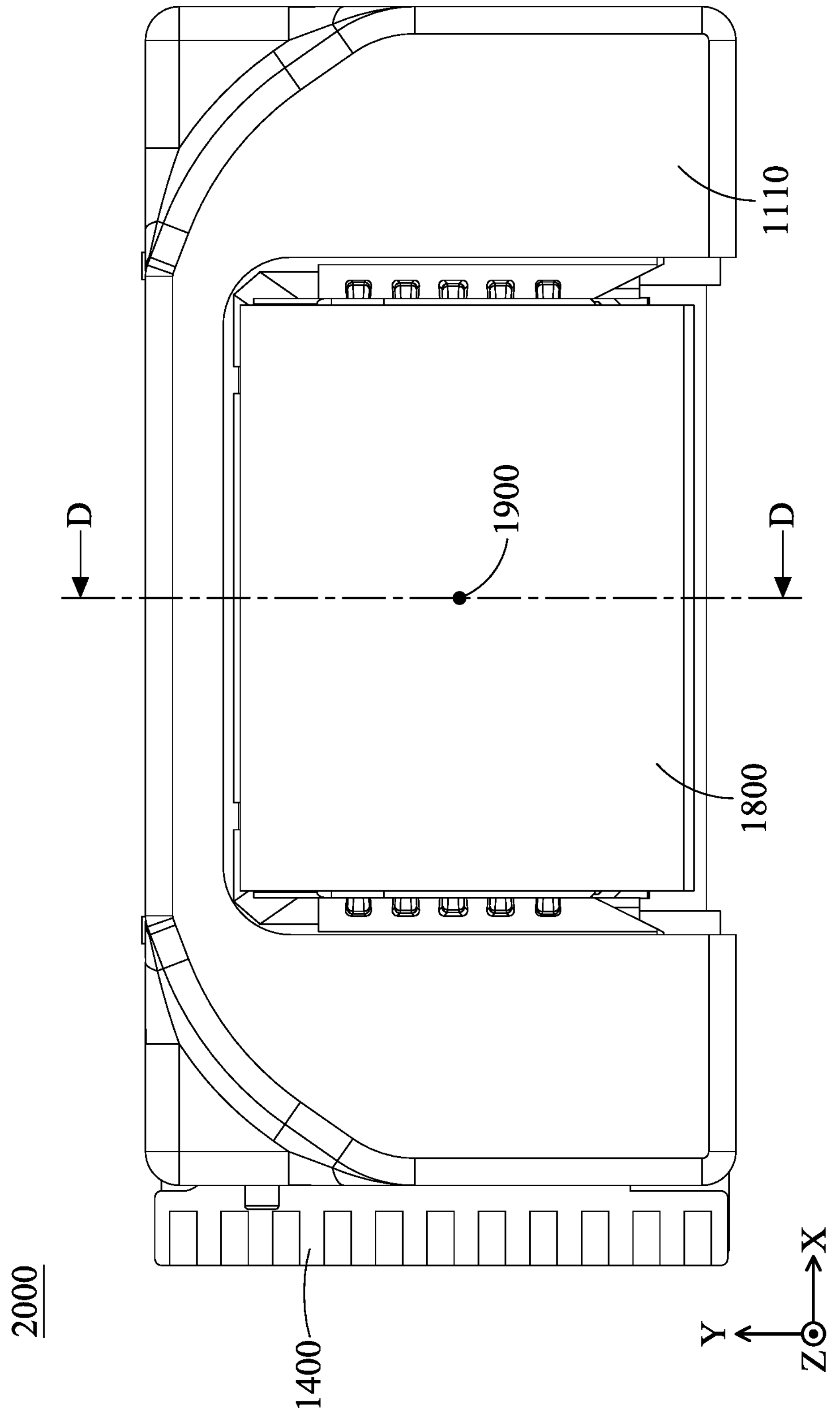
FIG. 6B is a top view of the optical element driving mechanism.
Figure 6C:
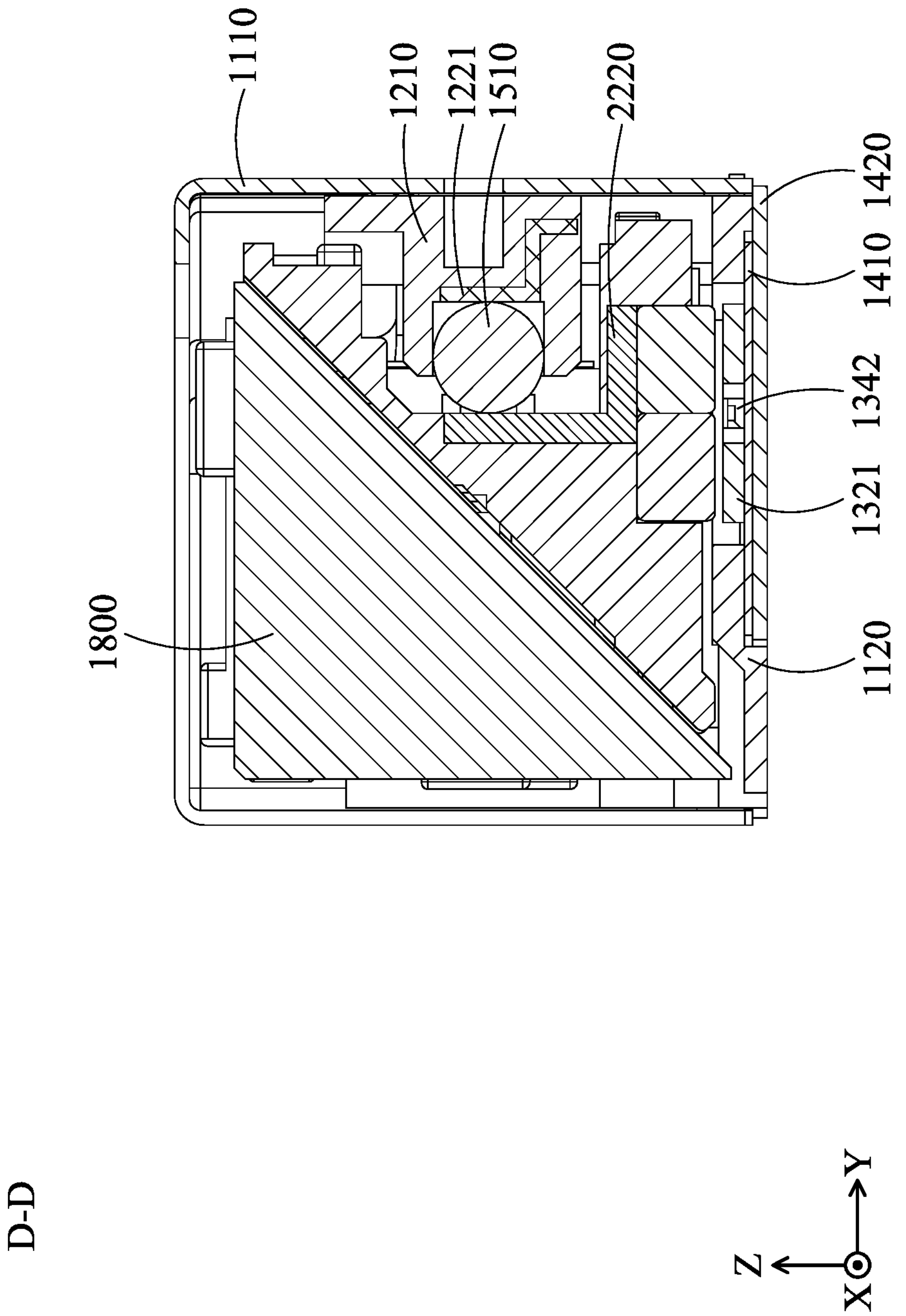
FIG. 6C is a cross-sectional view illustrated along a line D-D in FIG. 6B.
Figure 6D:
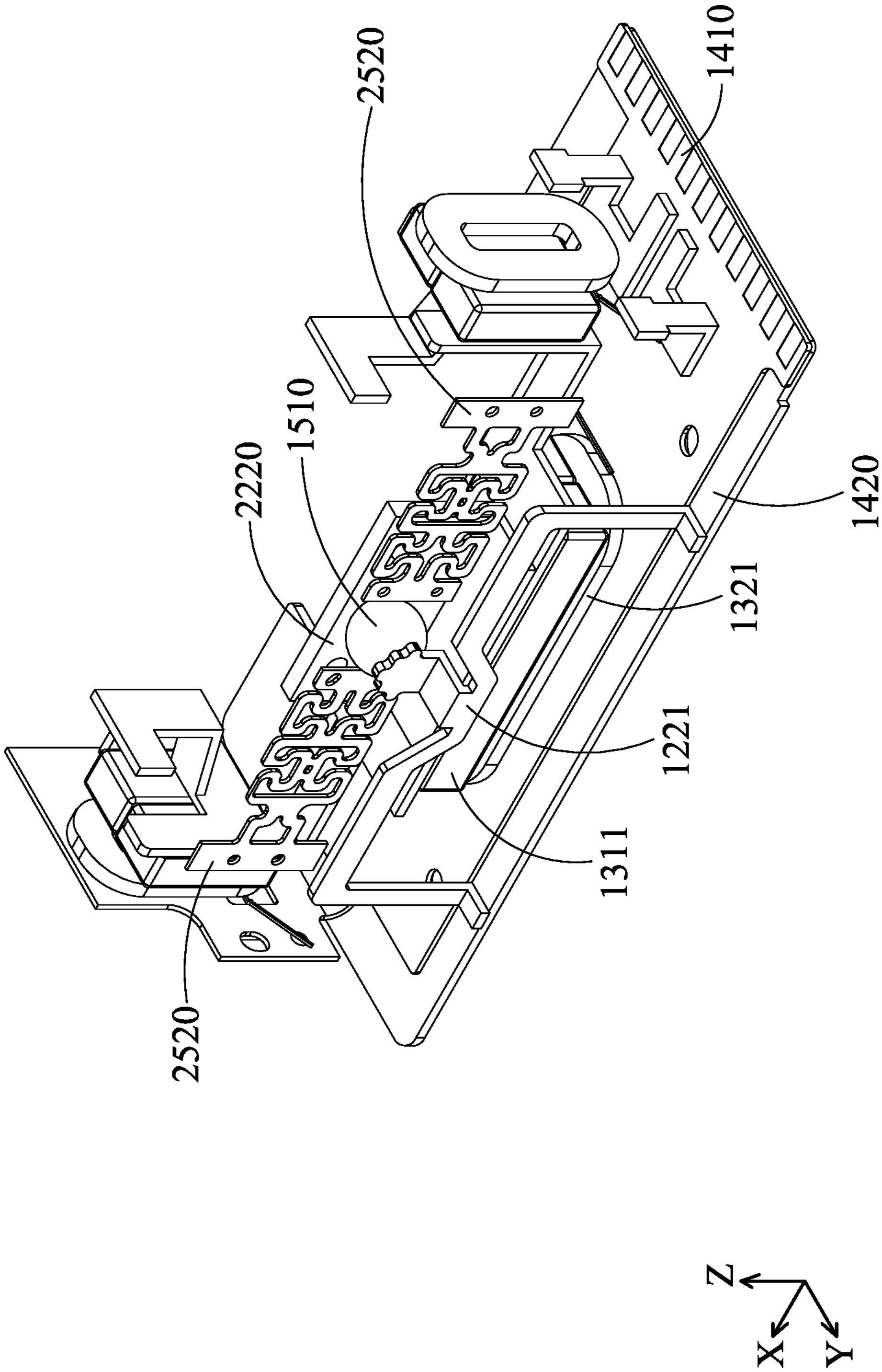
FIG. 6D is a schematic view of some elements of the optical element driving mechanism.
Figure 6E:
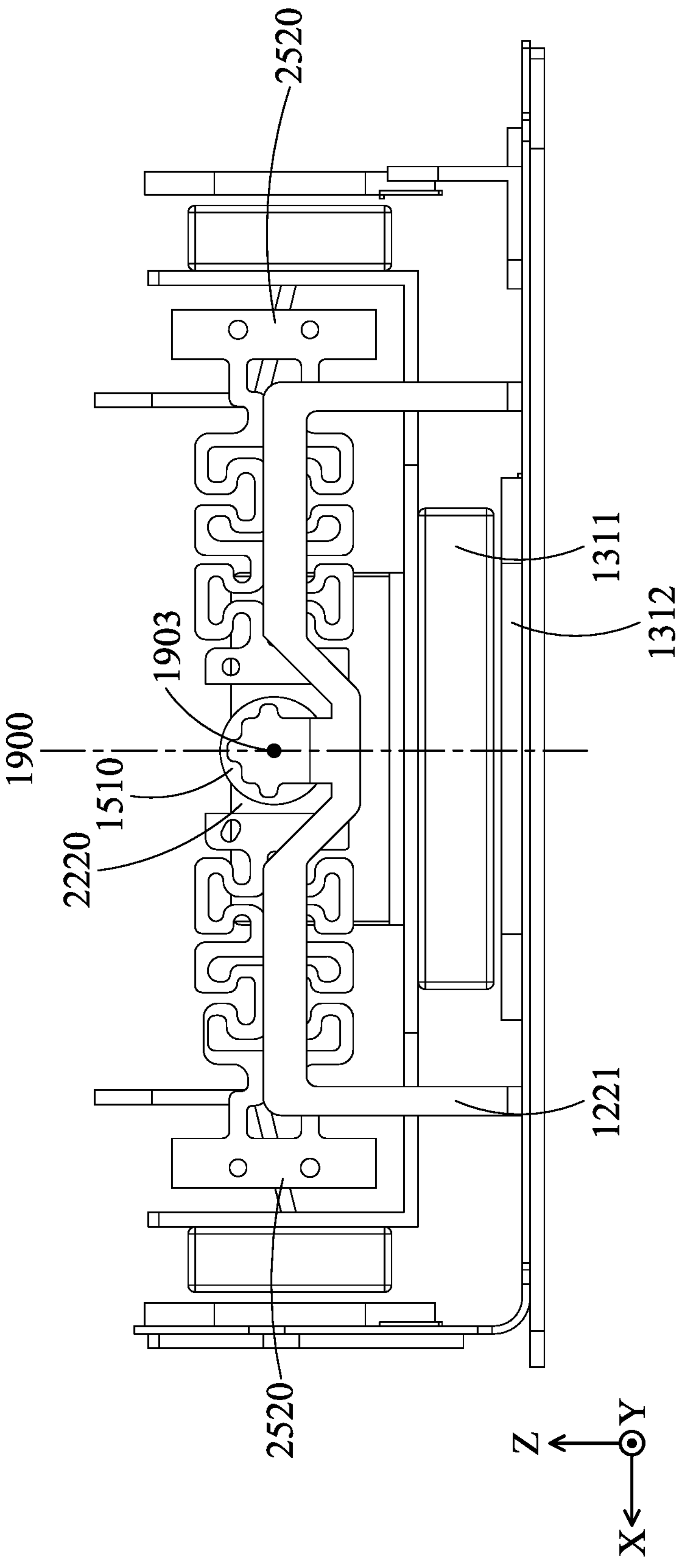
FIG. 6E is a rear view of some elements of the optical element driving mechanism.

Although the strengthen assembly 1220 and the contact element 1512 separated from each other are used as the contact surfaces of the support element 1510, the present disclosure is not limited thereto. For example, FIG. 6A is a schematic view of an optical element driving mechanism 2000. FIG. 6B is a top view of the optical element driving mechanism 2000. FIG. 6C is a cross-sectional view illustrated along a line D-D in FIG. 6B. FIG. 6D is a schematic view of some elements of the optical element driving mechanism 2000. FIG. 6E is a rear view of some elements of the optical element driving mechanism 2000. Elements similar to aforementioned embodiments are not described again.

The main difference between the optical element driving mechanism 2000 and the optical element driving mechanism 1000 is that the second strengthen element 1222 and the contact element 1512 are replaced by a second strengthen element 2220, and the resilient element 1520 is replaced by a resilient element 1520 in the optical element driving mechanism 2000. As shown in FIG. 6C, FIG. 6D, and FIG. 6E, in some embodiments, the support element 1510 may be affixed on one of the first strengthen element 1221 and the second strengthen element 2220 and may move relative to another one of the first strengthen element 1221 and the second strengthen element 2220, so the second strengthen element 2220 may be movably connected to the fixed portion 1110, such as may use the support element 1510 as a fulcrum to move in different dimensions. In some embodiments, the second strengthen element 2220 may be in direct contact with the support element 1510 and the first magnetic element 1311.

Furthermore, the optical element driving mechanism 2000 may include a plurality of resilient elements 2520. As shown in FIG. 6E, when viewed along the third axis 1903, the resilient elements 2520 are disposed on both sides of the support element 1510 in the Y axis, and the resilient elements 2520 are separated from each other. The support element 1510 and the resilient elements 2520 do not overlap each other in directions that the main axis 1900 or the third axis 1903 extend to reduce the sizes of the optical element driving mechanism 2000 in the main axis 1900 and the third axis 1903, so miniaturization may be achieved.

In summary, an optical element driving mechanism is provided, which includes a movable portion, a fixed portion, and a driving assembly. The movable portion is used for connecting to an optical element. The movable portion is movable relative to the fixed portion. The driving assembly is used for driving the movable portion to move relative to the fixed portion. Therefore, auto focus may be performed, the position of the movable portion may be stabilized, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
a movable portion connected to an optical element;
a fixed portion, wherein the movable portion is movable relative to the fixed portion;
a driving assembly used for driving the movable portion to move relative to the fixed portion;
a first sensing assembly used for detecting rotation of the movable portion relative to the fixed portion taking a first rotational axis as an axis of rotation, wherein the first sensing assembly comprises a first reference object and a first sensing element, the first sensing element corresponds to the first reference object, the first reference object comprises a first magnetic portion and a second magnetic portion arranged along a first axis; and
a second sensing assembly used for detecting the rotation of the movable portion relative to the fixed portion taking a second rotational axis as an axis of rotation, wherein the second sensing assembly comprises a second reference object and a second sensing element, the second sensing element corresponds to the second reference object, the second reference object comprises a third magnetic portion and a fourth magnetic portion arranged along a second axis, and a maximum size of the third magnetic portion is different from a maximum size of the fourth magnetic portion in the second axis.

2. The optical element driving mechanism as claimed in claim 1, wherein:
the first axis is parallel to the second axis;
a connection which connects centers of the second reference object and the second sensing element does not pass through the second rotational axis when viewed along the second rotational axis;
a first distance is between the third magnetic portion and the second rotational axis when viewed along the second rotational axis;
a second distance is between the fourth magnetic portion and the second rotational axis when viewed along the second rotational axis; and
the first distance and the second distance are different.

3. The optical element driving mechanism as claimed in claim 2, wherein:
a size difference between the first magnetic portion and the second magnetic portion in the first axis is different from a size difference between the third magnetic portion and the fourth magnetic portion in the second axis;
a shortest distance between the first sensing assembly and the first rotational axis is different from a shortest distance between the second sensing assembly and the second rotational axis;
a third distance is between the first rotational axis and a connection which connects centers of the first reference object and the first sensing element when viewed along the first rotational axis;
a fourth distance is between the second rotational axis and the connection which connects centers of the second reference object and the second sensing element when viewed along the second rotational axis; and
the third distance is different from the fourth distance.

4. The optical element driving mechanism as claimed in claim 3, wherein:
the maximum size of the third magnetic portion is greater than the maximum size of the fourth magnetic portion in the second axis;
the first distance is greater than the second distance;
the third distance is less than the fourth distance;
the size difference between the first magnetic portion and the second magnetic portion in the first axis is less than size difference between the third magnetic portion and the fourth magnetic portion in the second axis; and
the shortest distance between the first sensing assembly and the first rotational axis is less than the shortest distance between the second sensing assembly and the second rotational axis.

5. The optical element driving mechanism as claimed in claim 1, further comprising a circuit assembly, wherein:
the circuit assembly comprises a circuit element, a first reinforcement element, and a second reinforcement element;
the fixed portion comprises a case and a bottom;
the first reinforcement element is disposed between the bottom and the circuit element;
the second reinforcement element is disposed between the case and the circuit element;
the first reinforcement element is spaced apart from the second reinforcement element; and
the first reinforcement element and the second reinforcement element are not magnetic permeable.

6. The optical element driving mechanism as claimed in claim 5, further comprising a first adhesive element and a second adhesive element, wherein:
the first adhesive element is in direct contact with the case and the second reinforcement element;
the driving assembly comprises a first driving coil, a second driving coil, a third driving coil, and a third magnetic element;
the first driving coil, the second driving coil, and the third driving coil correspond to the first reference object, the second reference object, and the third magnetic element, respectively;
the first driving coil comprises a first leading wire;
the third driving coil comprises a third leading wire;
the second driving coil and the third driving coil are disposed on opposite sides of the movable portion; and
the second adhesive element is in direct contact with the case, the bottom, and the third leading wire.

7. The optical element driving mechanism as claimed in claim 6, further comprising a third adhesive element and a fourth adhesive element, wherein:
the third adhesive element is in direct contact with the case and the bottom;
the first reinforcement element comprises a first opening when viewed along a main axis;
the fourth adhesive element is disposed in the first opening;
the fourth adhesive element is in direct contact with the first driving coil; and
the fourth adhesive element surrounds the first leading wire.

8. The optical element driving mechanism as claimed in claim 6, wherein:
the first reinforcement element comprises a second opening and a third opening when viewed along the main axis;

the second opening extends in a fourth axis;

the third opening extends in a third axis;

the second axis and the third axis are parallel;

the second opening has a second length in the fourth axis and a second width in the third axis; and the third opening has a third length in the third axis and a third width in the fourth axis.

9. The optical element driving mechanism as claimed in claim 8, wherein:

the second length is greater than the second width;

the third length is greater than the third width; and the third axis and the fourth axis are not parallel.

10. The optical element driving mechanism as claimed in claim 1, further comprising an intermediate assembly, wherein the movable portion is movable relative to the fixed portion through the intermediate assembly;

the intermediate assembly comprises a support element and a contact element;

the contact element is in direct contact with the support element; and hardness of the support element is higher than hardness of the contact element.

11. The optical element driving mechanism as claimed in claim 10, wherein:

the contact element comprises metal;

the contact element is plate-shaped;

the movable portion comprises a base and a strengthen assembly;

the contact element is affixed on the base; and the strengthen assembly is affixed on the base and the fixed portion.

12. The optical element driving mechanism as claimed in claim 11, wherein:

hardness of the strengthen assembly is higher than hardness of the base;

the strengthen assembly is at least partially embedded in the base;

the strengthen assembly is at least partially embedded in the fixed portion;

the strengthen assembly is adjacent to the driving assembly; and magnetic permeability of the strengthen assembly is different from magnetic permeability of the contact element.

13. The optical element driving mechanism as claimed in claim 12, wherein:

the magnetic permeability of the strengthen assembly is greater than the magnetic permeability of the contact element;

the strengthen assembly comprises metal; and the base comprises plastic or rubber.

14. The optical element driving mechanism as claimed in claim 11, wherein:

the strengthen assembly comprises a first strengthen element and a second strengthen element;

the first strengthen element is spaced apart from the second strengthen element;

the first strengthen element and the second strengthen element are disposed on opposite sides of the support element; and the contact element is disposed between the support element and the second strengthen element.

15. The optical element driving mechanism as claimed in claim 14, wherein:

the contact element is in direct contact with the second strengthen element and the support element;

the second strengthen element is in direct contact with the first reference object; and a thickness of the second strengthen element is different from a thickness of the contact element.

16. The optical element driving mechanism as claimed in claim 15, wherein:

the thickness of the second strengthen element is less than the thickness of the contact element;

the optical element driving mechanism further comprises a resilient element disposed between the movable portion and the fixed portion;

the resilient element comprises a plurality of wiring portions, a connecting portion, and an opening when viewed along a third axis;

the connecting portion connects the wiring portions;

the opening and the connecting portion are at opposite sides of the support element when viewed along the third axis; and the support element and the connecting portion do not overlap each other when viewed along the third axis.

17. The optical element driving mechanism as claimed in claim 1, further comprising a support element and a plurality of resilient elements, wherein the movable portion comprises a strengthen assembly, and the strengthen assembly comprises a first strengthen element and a second strengthen element, wherein:

the movable portion is movable relative to the fixed portion through the support element; and the first strengthen element and the second strengthen element are disposed on opposite sides of the support element.

18. The optical element driving mechanism as claimed in claim 17, wherein:

the second strengthen element is in direct contact with the support element and the first reference object;

the resilient elements are disposed between the movable portion and the fixed portion; and the resilient elements are spaced apart from each other.

* * * * *